United States Patent [19]

Shundou et al.

[11] Patent Number: 5,330,858
[45] Date of Patent: Jul. 19, 1994

[54] SOLID ELECTROLYTE TYPE FUEL CELL POWER GENERATION MODULE AND SYSTEM

[75] Inventors: Hiroyuki Shundou; Tsuneo Nakanishi, both of Kawasaki, Japan

[73] Assignee: Fuji Electric Co., Ltd., Kanagawa, Japan

[21] Appl. No.: 890,263

[22] Filed: May 29, 1992

[30] Foreign Application Priority Data

May 30, 1991 [JP] Japan .................................. 3-126297
Sep. 4, 1991 [JP] Japan .................................. 3-223192

[51] Int. Cl.$^5$ .......................... H01M 8/02; H01M 8/22
[52] U.S. Cl. ........................................ 429/22; 429/26; 429/32; 429/37; 429/38; 429/39
[58] Field of Search ................ 429/26, 22, 32, 37, 429/38, 39; H01M 8/02, 8/22

[56] References Cited

U.S. PATENT DOCUMENTS

| | | | |
|---|---|---|---|
| 4,812,373 | 3/1989 | Grimble et al. | 429/19 |
| 4,910,100 | 3/1990 | Nakanishi et al. | 429/32 |
| 4,933,242 | 6/1990 | Koga et al. | 429/38 |

*Primary Examiner*—Kathryn Gorgos
*Attorney, Agent, or Firm*—Spencer, Frank & Schneider

[57] ABSTRACT

A solid electrolyte type fuel cell power generation system includes a power generation module, an inverter, and a control device. The module includes a stack chamber, a combustion chamber, and a heat exchanging chamber, partitioned one from the other by partition walls, are provided. The stack chamber has a cell stack, an oxidant gas exhaust chamber for collecting an oxidant gas exhausted from the cell stack, and a fuel gas exhaust chamber for collecting a fuel gas exhausted from the cell stack. The oxidant gas exhaust chamber and the fuel gas exhaust chamber are communicated through a first exhaust gas passage provided in the partition wall. In the combustion chamber, the exhaust oxidant and fuel gases which have passed through the first exhaust gas passage are burnt and the resulting combustion gas is introduced into the heat exchanging chamber through the second exhaust gas passage provided in the partition wall. The heat exchanging chamber has a heat exchanger and the fuel gas and the oxidant gas to be supplied to the cell stack are preheated, respectively.

24 Claims, 7 Drawing Sheets

SOLID ELECTROLYTE TYPE FUEL CELL POWER GENERATION MODULE AND SYSTEM

BACKGROUND OF THE INVENTION

1. Field of the Invention

The present invention relates to a power generation module including a fuel cell having an oxide solid electrolyte such as zirconia as an electrolyte for a fuel cell power generation system and more particularly to a power generation module including a planar solid electrolyte type fuel cell. The present invention also relates to a solid electrolyte type fuel cell power generation system including such a power generation module. Further, the present invention relates to a sealing device for use in such a power generation module.

2. Description of the Prior Art

Fuel cells having an oxide solid electrolyte such as zirconia as the electrolyte operate at high temperatures as high as, for example, 800° to 1,000° C. and, hence, exhibit high efficiencies of power generation and require no noble metal catalyst. Because of the electrolyte being solid, such a type of fuel cell requires no management of electrolytes that is indispensable in other types of fuel cells. As a result, oxide solid electrolyte fuel cells are easy to handle and are hoped to be a third generation fuel cell.

However, oxide solid electrolyte type fuel cells use ceramics as major components and hence, they are susceptible to thermal damages due to thermal stress. If the entire fuel cell of this type is to be fixed with a ceramic adhesive, or the like, in order to seal it against gases, thermal stress tends to occur, which makes it difficult to realize a practical fuel cell. This difficulty has been overcome by the provision of a cylindrical cell, which is free from problems of the occurrence of thermal stress and necessity of gas sealing. In some cases, operational tests with such a cylindrical fuel cell have been successful. However, the cylindrical fuel cell shows a relatively low power generation density per unit volume of the cell, and at present, there is no expectation that an economically advantageous fuel cell can be obtained. Accordingly, to increase power generation density, fuel cells must be of a planar type.

FIG. 1 is a horizontal cross sectional view showing a conventional planar type solid electrolyte fuel cell as described in U.S. Pat. No. 4,910,100, and FIG. 2 is a vertical cross sectional view of the conventional planar type solid electrolyte fuel cell taken along the line II—II in FIG. 1. As shown in FIGS. 1 and 2, a cell stack 1 includes a plurality of single cells 2 and a plurality of separator plates 3, alternately built up one on another. Separator plates 3A are provided on the top and bottom of the stack 1, respectively. An oxidant gas supply manifold 4 and a fuel gas supply manifold 5 are provided in the central area of the cell stack 1. A plurality of guide vanes 6 are provided concentrically around the central area. Reactant gases, i.e., an oxidant gas and a fuel gas, are supplied from the oxidant gas supply manifold 4 and the fuel gas supply manifold 5, respectively, and directed by the guide vanes 6 to circumferential portions of the cell stack 1. The reactant gases are burnt in the outer periphery of the cell stack and introduced to a heat exchanger (not shown) through a pipe (not shown).

However, in the aforementioned conventional fuel cell, the exhaust fuel gas and the exhaust oxidant gas in the outer periphery of the cell stacks are mixed with each other and burnt at once. This results in an extraordinary increase in the temperature of the cell stack, and hence, it becomes difficult to stably run the fuel cell. This problem becomes much more severe especially when a plurality of stacks are arranged. Another problem involved is that metal pipes, conductors and the like are readily oxidized in an oxidative atmosphere at a high temperature and the service life of the fuel cell decreases accordingly. If the pipe used to conduct generated heat to the heat exchanger is long, there arise not only a problem of heat loss but also a problem of shortened service life of the pipe.

SUMMARY OF THE INVENTION

Therefore, an object of the present invention is to provide a solid electrolyte type fuel cell power generation system which is highly reliable and stable by constructing a system in which combustion of exhaust gases and heat exchange are optimized.

Another object of the present invention is to provide a solid electrolyte type fuel cell power generation system in which a large number of small- to medium-capacity cell stacks can be arranged to enable large-capacity power generation.

Still another object of the present invention is to provide a sealing device such as a clamping device for clamping cell stacks with a sufficient adaptability.

Therefore, according to a first aspect of the present invention, (1) a solid electrolyte type fuel cell power generation system comprises:

(A) a power generation module including:
   (a) a heat insulated vessel,
   (b) a first partition wall provided in the heat insulated vessel and having a first exhaust gas passage,
   (c) a second partition wall provided in the heat insulated vessel and having a second exhaust gas passage,
   (d) a stack chamber provided in the heat insulated vessel and partitioned by the first partition wall, the stack chamber having first and second inner surfaces,
   (e) a combustion chamber provided in the heat insulated vessel adjacent to the stack chamber through the first partition wall, and partitioned by the first and second partition walls, the combustion chamber being communicated with the stack chamber through the first exhaust gas passage,
   (f) a heat exchanging chamber provided in the heat insulated vessel adjacent to the combustion chamber through the second partition wall, the heat exchanging chamber communicating with the combustion chamber through the second exhaust gas passage,
   (g) a cell stack provided in the stack chamber with gaps between it and the first and second inner surfaces of the stack chamber, respectively, the cell stack having:
      (g-1) a plurality of single cells built up one on another,
      (g-2) an oxidant gas supply manifold for supplying an oxidant gas to the single cells and extending through the plurality of single cells,
      (g-3) a fuel gas supply manifold for supplying a fuel gas to the single cells and extending through the plurality of single cells, and (g-4) a current output conductor for outputting electricity generated by the single cells and connected to the cell stack, (h) a sealing device provided in the stack chamber and in contact with the cell stack and the first and second inner surfaces, respectively, of the stack chamber, the sealing device for sealing gaps between the cell stack and the first and second inner surfaces, (i) an oxidant gas exhaust chamber for collecting an oxidant gas exhausted from the cell stack, the oxidant gas exhaust chamber provided in the stack chamber and partitioned by the sealing device and the cell stack, the oxidant gas exhaust chamber communicating with the combustion chamber through the first exhaust gas passage, (j) a fuel gas exhaust chamber for collecting a fuel gas exhausted from the cell stack, the fuel gas exhaust chamber provided in the stack chamber and partitioned by the sealing device and the cell stack, the fuel gas exhaust chamber communicating with the combustion chamber through the first exhaust gas passage, (k) a heat exchanger, provided in the heat exchanging chamber, for preheating the fuel gas and the oxidant gas supplied to the cell stack, respectively, (l) a fuel gas supply pipe communicating with the heat exchanger, and (m) an oxidant gas supply pipe communicating with the heat exchanger;

(B) an inverter connected to the cell stacks in the stack chamber and for inverting direct current generated by the single cells into alternating current; and (C) a control device connected to the power generation module and the control device, controlling operation of the power generation system;

whereby the exhaust oxidant gas and the exhaust fuel gas, exhausted from the cell stack and passed through the first exhaust gas passage, are burnt in the combustion chamber to form a combustion gas, and the combustion gas is introduced into the heat exchanging chamber.

According to a second aspect of the present invention, (2) a power generation module for a solid electrolyte type fuel cell power generation system, comprises:

(a) a heat insulated vessel, (b) a first partition wall provided in the heat insulated vessel and having a first exhaust gas passage, (c) a second partition wall provided in the heat insulated vessel and having a second exhaust gas passage, (d) a stack chamber provided in the heat insulated vessel and partitioned by the first partition wall, the stack chamber having first and second inner surfaces, (e) a combustion chamber provided in the heat insulated vessel adjacent to the stack chamber through the first partition wall, and partitioned by the first and second partition walls, the combustion chamber communicating with the stack chamber through the first exhaust gas passage, (f) a heat exchanging chamber provided in the heat insulated vessel adjacent to the combustion chamber through the second partition wall, the heat exchanging chamber communicating with the combustion chamber through the second exhaust gas passage, (g) a cell stack provided in the stack chamber with gaps between it and the first and second inner surfaces of the stack chamber, respectively, the cell stack having:

(g-1) a plurality of single cells built up one on another, (g-2) an oxidant gas supply manifold for supplying an oxidant gas to the single cells and extending through the plurality of single cells, (g-3) a fuel gas supply manifold for supplying a fuel gas to the single cells and extending through the plurality of single cells, and (g-4) a current output conductor for outputting electricity generated by the single cells and connected to the cell stack, (h) a sealing device provided in the stack chamber and in contact with the cell stack and the first and second inner surfaces, respectively, of the stack chamber, the sealing device for sealing gaps between the cell stack and the first and second inner surfaces, (i) an oxidant gas exhaust chamber for collecting an oxidant gas exhausted from the cell stack, the oxidant gas exhaust chamber provided in the stack chamber and partitioned by the sealing device and the cell stack, the oxidant gas exhaust chamber being communicating with the combustion chamber through the first exhaust gas passage, (j) a fuel gas exhaust chamber for collecting a fuel gas exhausted from the cell stack, the fuel gas exhaust chamber provided in the stack chamber and partitioned by the sealing device and the cell stack, the fuel gas exhaust chamber communicating with the combustion chamber through the first exhaust gas passage, (k) a heat exchanger, provided in the heat exchanging chamber, for preheating the fuel gas and the oxidant gas supplied to the cell stack, respectively, (l) a fuel gas supply pipe communicating with the heat exchanger, and (m) an oxidant gas supply pipe communicating with the heat exchanger;

whereby the exhaust oxidant gas and the exhaust fuel gas, exhausted from the cell stack and passed through the first exhaust gas passage, are burnt in the combustion chamber to form a combustion gas, and the combustion gas is introduced into the heat exchanging chamber.

Here, (3) in the aforementioned solid electrolyte type fuel cell power generation system (1) and (2) power generation module therefor, the stack chamber may comprise a plurality of cell stacks.

(4) In the aforementioned system (1) and module (2), the oxidant gas supply manifold, the fuel gas supply manifold, and the current output conductor may be arranged in the fuel gas exhaust chamber.

(5) In the aforementioned system (1) and module (2), the sealing device may comprise a clamp cylinder provided outside the power generation module, a clamp rod connected to and actuated by the cylinder, and a sealing member tightened by the clamp rod.

(6) In the aforementioned system (5) and module (5), the clamp rod may be provided in the fuel gas exhaust chamber.

(7) In the aforementioned system (5) and module (5), the clamp cylinder may be a hydraulic cylinder or a gas cylinder.

(8) In the aforementioned system (1) and module (2), the sealing device may comprise an intermediate pad and an upper pad, the intermediate pad provided between the cell stack and the first inner surface of the stack chamber and between the cell stack and the first partition wall.

(9) In the aforementioned system (3) and module (3), the sealing device may comprise an intermediate pad device and an upper pad device, the intermediate pad device comprising a plurality of intermediate pads provided between the cell stacks, between one of the cell stacks and the first inner surface of the stack chamber, and between one of the cell stack and the first partition wall, respectively, and the upper pad device provided between the second inner surface of the stack chamber and respective upper portions of the cell stacks and respective upper portions of the intermediate pads.

(10) In the aforementioned system (9) and module (9), the intermediate pad may comprise a fibrous sealing member, a pair of metal clamp plates formed with through holes, respectively, and sandwiching the fibrous sealing member therebetween, and a bolt engaged with the through holes of the clamp plates.

(11) In the aforementioned system (9) and module (9), the upper pad may comprise a pair of clamp plates formed with through holes, respectively, a bolt engaged with the through holes, a fibrous sealing member sandwiched between the clamp plates, a pressing jig provided on the second inner surface of the stack chamber, and a pressing plate contacting the pressing jig and the fibrous sealing member.

(12) In the aforementioned system (1) and module (2), the solid electrolyte type fuel cell power generation system may further comprise a starting burner in the combustion chamber.

(13) In the aforementioned system (3) and module (3), the cell stacks may be arranged in a point-centered symmetry.

(14) In the aforementioned system (13) and module (13), the power generation module may have the combustion chamber in a central area thereof, the stack chamber surrounding the combustion chamber.

(15) In the aforementioned system (14) and module (14), the power generation module may have the heat exchanging chamber in a central area thereof.

(16) In the aforementioned system (15) and module (15), the oxidant gas supply manifold, the fuel gas supply manifold, and the current output conductor may be arranged in the fuel gas exhaust chamber.

(17) In the aforementioned system (15) and module (15), the sealing device may comprise a clamp cylinder provided outside the power generation module, a clamp rod connected to and actuated by the cylinder, and a sealing member tightened by the clamp rod.

(18) In the aforementioned system (17) and module (17), the clamp rod may be provided in the fuel gas exhaust chamber.

(19) In the aforementioned system (17) and module (17), the clamp cylinder may be a hydraulic cylinder or a gas cylinder.

(20) In the aforementioned system (15) and module (15), the sealing device may comprise an intermediate pad device and an upper pad device, the intermediate pad device comprising a plurality of intermediate pads being provided between the cell stacks, between one of the cell stacks and the first inner surface of the stack chamber, and between one of the cell stack and the first partition wall, respectively, and the upper pad device being provided between the second inner surface of the stack chamber and respective upper portions of the cell stacks and respective upper portions of the intermediate pads.

(21) In the aforementioned system (20) and module (20), the intermediate pad may comprise a fibrous sealing member, a pair of metal clamp plates formed with through holes, respectively, and sandwiching the fibrous sealing member therebetween, and a bolt engaged with the through holes of the clamp plates.

(22) In the aforementioned system (20) and module (20), the upper pad may comprise a pair of clamp plates formed with through holes, respectively, a bolt engaged with the through holes, a fibrous sealing member sandwiched between the clamp plates, a pressing jig provided on the second inner surface of the stack chamber, and a pressing plate contacting the pressing jig and the fibrous sealing member.

(23) In the aforementioned system (15) and module (15), the solid electrolyte type fuel cell power generation system may further comprise a starting burner in the combustion chamber.

According to a third aspect of the present invention, a sealing device for sealing a stack chamber in a power generation module for a solid electrolyte type fuel cell power generation system, the power generation module having:

(i) a heat insulated vessel having an outer surface, an inner wall surface, and a ceiling, (ii) a first partition wall provided in the heat insulated vessel and having therein a first exhaust gas passage, (iii) a second partition wall provided in the heat insulated vessel and having therein a second exhaust gas passage, (iv) a stack chamber provided in the heat insulated vessel and partitioned by the first partition wall, the stack chamber containing a cell stack having a plurality of single cells built up one on another, an oxidant gas supply manifold extending through the plurality of single cells, and a fuel gas supply manifold extending through the plurality of single cells, (v) a combustion chamber provided in the heat insulated vessel adjacent to the stack chamber through the first partition wall, and partitioned by the first and second partition walls, the combustion chamber communicating with the stack chamber through the first exhaust gas passage, and a current output conductor connected to the cell stack, and (vi) a heat exchanging chamber provided in the heat insulated vessel adjacent to the combustion chamber through the second partition wall, the heat exchanging chamber being communicating with the combustion chamber through the second exhaust gas passage, wherein the ceiling of the heat insulated vessel is formed with a slit, and
wherein the sealing device comprises:
  (a) an intermediate pad provided between the cell stack and the inner side wall surface of the stack chamber, or between the cell stack and the first partition wall, and for sealing gaps therebetween, the intermediate pad having:
    (a-1) a fibrous sealing member, (a-2) a pair of metal clamp plates formed with through holes, respectively, and sandwiching the fibrous sealing member therebetween, and (a-3) a bolt in a thread engagement with the through holes of the clamp plates; and (b) an upper pad provided between the ceiling of the heat insulated vessel and the cell stack and between the ceiling of the heat insulated vessel and the intermediate pad and for sealing gaps therebetween, the upper pad comprising:

(b-1) a fibrous sealing member, (b-2) a pair of clamp plates formed with through holes, respectively, and sandwiching therebetween the fibrous sealing member, (b-3) a bolt in a thread engagement with the through holes, (b-4) a pressing plate having first and second ends and inserted in the slit in the ceiling of the heat insulated vessel, with the first end contacting the sealing member, and the second end being outside the heat insulated vessel, (b-5) a pressing jig provided outside the inner wall surface of the heat insulated vessel, and contacting outer surface of the heat insulated vessel, the pressing jig having a central portion and both ends, the central portion is in contact with the second end of the pressing plate, the pressing jig being attached on the both ends to the outer surface of the heat insulated vessel and capable of advancing and retreating with respect to the outer surface of the heat insulated vessel.

By the above construction, the exhaust oxidant gas and the exhaust fuel gas are burnt in the combustion chamber separated from the cell stacks by the partition wall, which prevents overheating of the cell stacks, etc. Also, the cell stacks, the fuel gas supply manifold, the oxidant gas supply manifold, the current output conductors are prevented from being heated directly by oxidative gas at high temperatures. Further, provision of the second exhaust gas passage to connect the combustion chamber to the heat exchanging chamber shortens the distance along which the gas flows to thereby reduce heat loss and enables the introduction of the combustion gas into the heat exchanging chamber with requiring no special pipe. As a result, heat generated in the combustion chamber can be used for efficiently preheating the gas supplied to the cell stacks without providing a high temperature pipe for flowing the exhaust gas. Thus, according to the present invention, a solid electrolyte type fuel cell having a high reliability and stability can be provided.

The above and other objects, effects, features and advantages of the present invention will become more apparent from the following description of embodiments thereof taken in conjunction with the accompanying drawings.

DESCRIPTION OF PREFERRED EMBODIMENTS

Referring to the accompanying drawings, the present invention will be described in more detail below.

Figure 1:
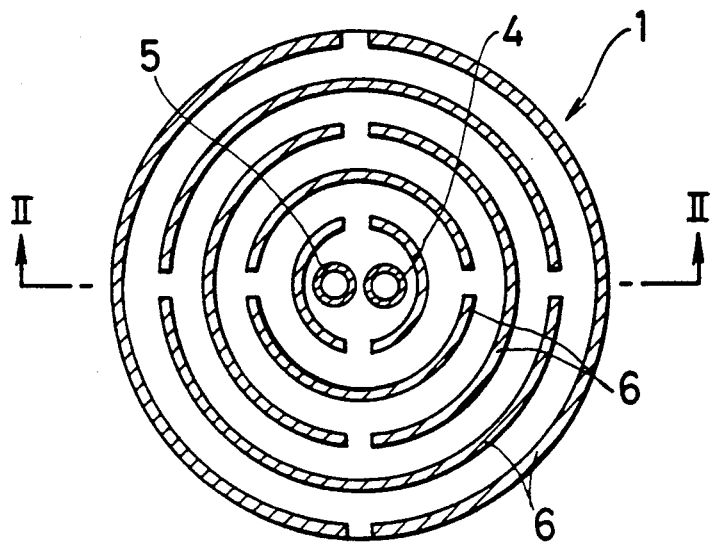
FIG. 1 is a horizontal cross sectional view showing a conventional planar solid electrolyte type fuel cell having a cell stack.
Figure 2:
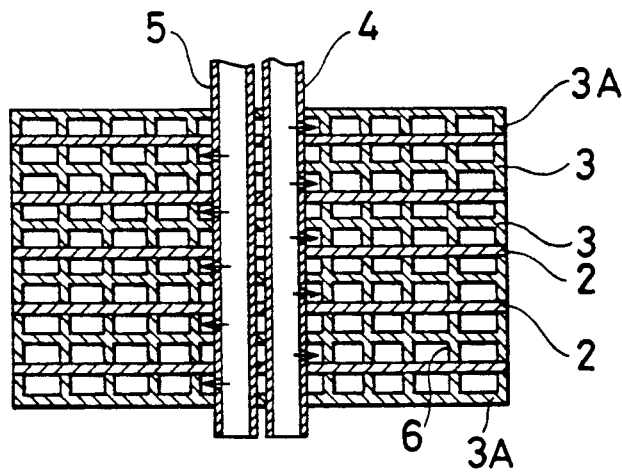
FIG. 2 is a vertical cross sectional view showing the conventional planar solid electrolyte type fuel cell shown in FIG. 1, as viewed in the direction indicated by arrows II—II in FIG. 1.
Figure 3:
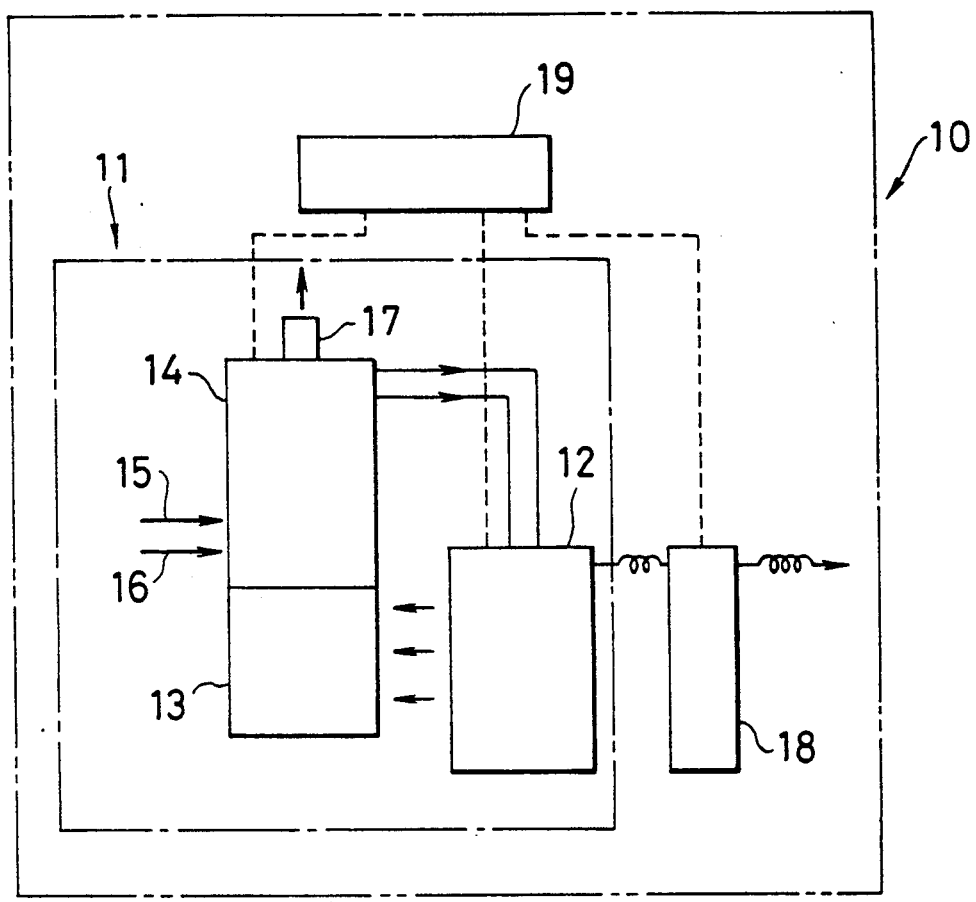
FIG. 3 is a block diagram illustrating major components of a solid electrolyte type fuel cell power generation system according to one embodiment of the present invention.

First, referring to FIG. 3, explanation will be made on a solid electrolyte type fuel cell power generation system according to an embodiment of the present invention. FIG. 3 is a block diagram illustrating major components of a solid electrolyte type fuel cell according to a first example of the present invention.

As shown in FIG. 3, a fuel cell power generation system 10 of the present invention includes a power generation module 11 of a solid electrolyte type fuel cell having a stack chamber 12 encasing one or more cell stacks each having a plurality of single cells (37 in FIG. 5; 137 in FIG. 9), a combustion chamber 13 for burning exhaust gas from the stack chamber 12, and a heat exchanging chamber 14 having a heat exchanger (64 in FIG. 4; 164 in FIG. 9) for exchanging heat generated by combustion and carried by the combustion gas, a fuel gas supply pipe 15 for supplying a fuel gas from a fuel gas source (not shown) to the cell stacks, an oxidant gas supply pipe 16 for supplying an oxidant gas from an oxidant gas source (not shown) to the cell stacks, and an exhaust gas duct 17 for exhausting combustion gas after heat exchanging, an inverter 18 for inverting the direct current generated by the fuel cell into an alternating current, and a control device 19 for controlling the operation of the fuel cell power generation system 10. The inverter 18 and the control device may be conventional ones, respectively.

The power generation module 10 includes in its stack chamber 12 one or more cell stacks each having a plurality of single cells. Exhaust gas from the single cells is introduced into the exhaust gas combustion chamber 13 and burnt therein. The combustion gas is introduced into the heat exchanging chamber 14 and brought in contact with the heat exchanger to exchange heat generated as a result of combustion. Then, the exhaust gas is exhausted from the exhaust gas duct 17. Reactant gases, i.e., a fuel gas and an oxidant gas are introduced into the heat exchanger in the heat exchanging chamber 14 through the fuel gas supply pipe 15 and the oxidant gas supply pipe 16, respectively, and preheated, and then supplied to the single cells. Direct current generated is inverted into an alternating current through the inverter 18, and is supplied to distribution lines. The control device 19 controls the module 11 so that it can be operated well.

In the arrangement shown in FIG. 3, the term "module" as used herein refers to a separable component that includes a plurality of cell stacks encased in the stack chamber 12, each cell stack having several single cells built up one on another, the exhaust gas combustion chamber 13, the heat exchanger 14, and the like. The power generation module 11 including the stack chamber 12, the combustion chamber 13, and the heat exchanging chamber 14 can be constructed, for example, as described in detail in the following examples hereinbelow.

EXAMPLES

Referring to FIGS. 4 to 9, the present invention will be described in more specifically by examples. However, the present invention should not be construed as being limited thereto.

EXAMPLE 1

Figure 4:
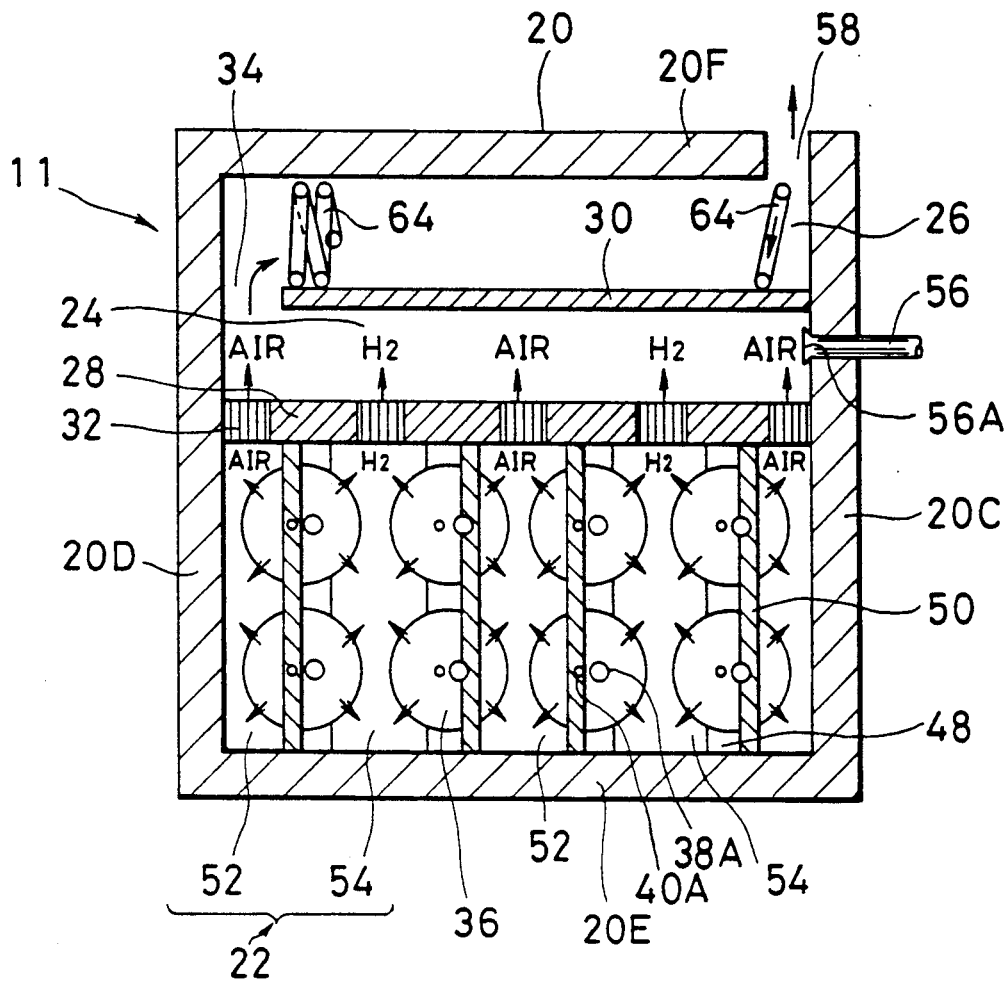
FIG. 4 is a schematic horizontal cross sectional view showing a power generation module of a solid electrolyte type fuel cell according to a first example of the present invention.
Figure 5:
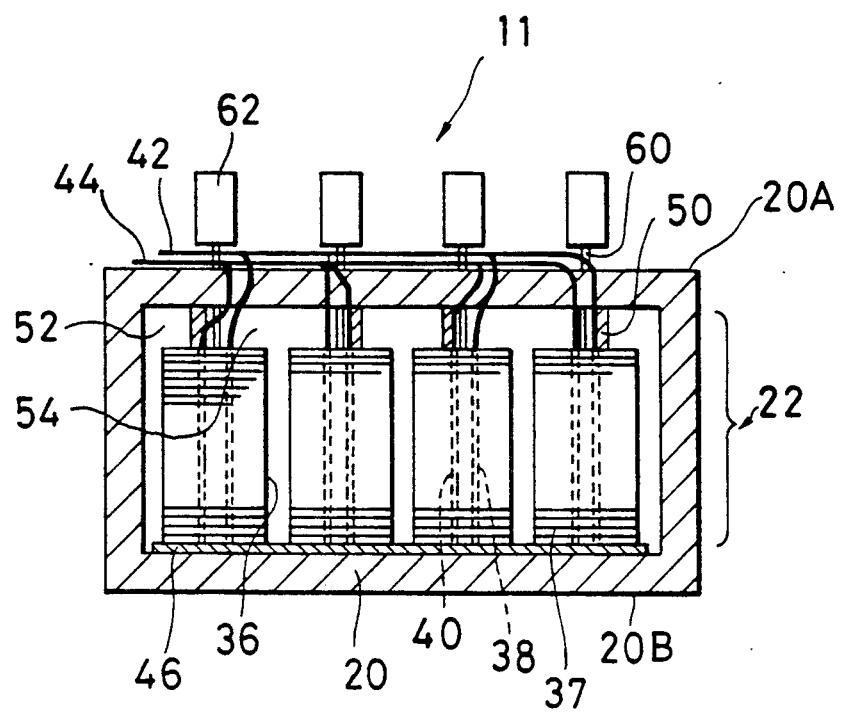
FIG. 5 is a vertical cross sectional view showing the power generation module shown in FIG. 4.

FIG. 4 is a schematic horizontal cross sectional view showing a power generation module of a solid electrolyte type fuel cell according to a first example of the present invention; and FIG. 5 is a vertical cross sectional view showing the power generation module of a solid electrolyte type fuel cell according to the first example of the present invention shown in FIG. 4.

Referring to FIGS. 4 an 5, the power generation module 11 includes a generally rectangular solid shaped heat insulated vessel 20, in which a stack chamber 22 (corresponding to 12 in FIG. 3), a combustion chamber 24 (corresponding to 13 in FIG. 3), and a heat exchanging chamber 26 (corresponding to 14 in FIG. 3) are provided. The stack chamber 22 is isolated from the combustion chamber 24 by a partition wall or heat insulating wall 28. On the other hand, the heat exchanging chamber 26 is partitioned from the combustion chamber 24 by a partition wall or heat insulating wall 30. The partition wall 28 is provided with a plurality of first exhaust gas passages 32, which communicate the stack chamber 22 with the combustion chamber 24. The partition wall 30 is provided with a second exhaust gas passage 34, which communicates the combustion chamber 24 with the heat exchanging chamber 26.

In the stack chamber 22 are provided, for example, eight cell stacks 36 arranged, for example, in two rows as shown in FIG. 4. Each cell stack 36 includes a plurality of single cells 37 (FIG. 5) built up one on another, and has in the central portion thereof an oxidant gas supply manifold 38 communicating with an oxidant gas inlet port 38A provided on the top of each cell stack 36, and a fuel gas supply manifold 40 communicating with a fuel gas inlet port 40A provided on the top of each cell stack 36. The heat insulated vessel 20 has an upper wall 20A, through which an oxidant gas inlet pipe 42 (corresponding to 15 in FIG. 3) and a fuel gas inlet pipe 44 (corresponding to 16 in FIG. 3) are arranged. These pipes 42 and 44 are connected to the oxidant gas inlet port 38A and the fuel gas inlet port 40A, respectively. The cell stacks 36, which are arranged in two rows and spaced apart one from another, are mounted on a conductor plate 46 to thereby connect each cell stack 36 electrically. A switching mechanism (not shown) is provided to enable any of series or parallel connection of the cell stacks.

In the cell stack chamber 22 in which the cell stacks 36 are arranged in two rows are intermediate (or lower) gaps and upper gaps. The lower gaps (intermediate gaps) include those between the cell stacks themselves, i.e., corresponding members in the two rows. Also, the lower gaps include those between the partition wall and some of the cell stacks 36, i.e., those cell stacks arranged in the row closer to the partition wall 28, and between one of side walls, side wall 20E, of the heat insulated vessel 20 (a side wall parallel to the heat insulating wall 28), or a side inner surface of the stack chamber 22, and those cell stacks 36 arranged in the row closer to the inner surface of the side wall 20E of the stack chamber 22. First or intermediate pads (or lower pads) 48 are provided between the cell stacks 36 to fill the interstack gaps. The intermediate pads for filling the interstack gaps may be called interstack pads. The intermediate pads are also provided between the cell stacks and the heat insulating wall 28, and between the cell stacks and the side inner surface of the stack chamber 22 to fill or seal these gaps. Thus, the intermediate pads used in the present invention includes a pad which contacts one cell stack and the side inner surface of the stack chamber, or a pad which contacts two cell stacks (interstack pad), or both types of pads. After the intermediate pads are fitted to the gaps, there remains still gaps between the inner surface of the upper wall, or ceiling, 20A of the heat insulated vessel 20 (or the stack chamber 22) and respective upper portions of all the cell stacks 36 and upper portions of the intermediate pads 48. Second or upper pads 50 are provided between the respective upper portions of the cell stacks 36 and the inner surface of the upper wall 20A, and between the respective upper portions of the intermediate pads 48 and the ceiling 20A, to fill or seal these upper gaps. As a result, oxidant gas exhaust chambers 52 and fuel gas exhaust chambers 54 are formed in the stack chamber 22, defined by the cell stacks 36, the intermediate pads 48 and the upper pads 50. The oxidant gas exhaust chambers 52 and the fuel gas exhaust chambers 54 are arranged alternately and in parallel with the inner surfaces of the side walls 20C and 20D, respectively, of the heat insulated vessel 20 (or the stack chamber 22).

The power generation system of the present invention also has a starting burner 56. The starting burner 56 has a nozzle orifice 56A, which extends through a portion of the side wall 20C that corresponds to the combustion chamber 24 and opens in the combustion chamber 24. An exhaust gas outlet port 58 is formed in the side wall 20F of the heat insulated vessel 20. An exhaust gas duct similar to the exhaust gas duct 17 in FIG. 3 may be connected to an exhaust gas outlet port 58 provided in the side wall 20F.

A clamp rod 60 is butted on the upper end of each cell stack 36. Each clamp rod 60 is connected to a clamp cylinder 62. The clamp cylinder pneumatically or hydraulically actuates the clamp rod 60 to move to and fro to thereby adjust the clamping of the cell stack 36 by the clamp rod 60. The clamp cylinder may be a gas cylinder or a hydraulic cylinder (oil cylinder)

In the heat exchanging chamber 20 there is provided a heat exchanger or regenerator 64, which is connected at one end thereof to an oxidant gas inlet pipe 42 and the fuel gas inlet pipe 44, and at the other end thereof to the oxidant gas inlet port 38A and the fuel gas inlet port 40A.

In the fuel cell power generation system having the aforementioned construction, the starting burner 56 is ignited, and a fuel gas and an oxidant gas are burnt in the combustion chamber 24 with heating the heat exchanger 64. On this occasion, $N_2$ gas is blown in the fuel gas inlet pipe 44 and the oxidant gas inlet pipe 42 and reaches the heat exchanger 64 where $N_2$ gas is heated, and then supplied to the cell stacks 36 to elevate the temperature of the cell stacks. When the temperatures of the cell stacks 36 reach a predetermined temperature, air is supplied into the oxidant gas inlet pipe 42, and a fuel gas such as natural gas is supplied into the fuel gas inlet pipe 44 to initiate power generation. When a state is reached where the power generation system is run stably, the starting burner 56 is stopped. When the power generation is to be stopped, a load of the power generation module is disconnected and at the same time the supply of the oxidant gas and the fuel gas is stopped and instead, $N_2$ is supplied. As a result, there is no longer a heat source so that power generation stops and the temperature of the cell stacks decreases.

Next, explanation will be made on steady-state operation of the power generation system of the present invention. After the oxidant gas and the fuel gas have been passed through the heat exchanger 64 and heated to temperatures on the order within the range of 700° to 900° C., the oxidant gas and the fuel gas are supplied to the cell stacks 36 via the respective oxidant gas inlet ports 38A and the fuel gas inlet ports 40A, respectively, provided in the central portion of the cell stacks and on the top thereof, and through the oxidant gas supply manifold 38 and the fuel gas supply manifold 40, respectively. The oxidant gas and the fuel gas from the cell stacks 36 are exhausted into the oxidant gas exhaust chamber 52 and the fuel gas exhaust chamber 54, respectively, which chambers are partitioned by the upper pads 50 and the intermediate pads 48 as well as the cell stacks 36 themselves. The exhausted reactant gases are supplied to the combustion chamber 24 through the first exhaust gas passage 32 provided in the heat insulating wall 28. In the combustion chamber 24, the reactant gases are mixed and burnt. The combustion gas is directed toward the heat exchanger 64, and after being cooled down to 400° C. or lower, it is released from the exhaust gas outlet port 58.

The heat insulated vessel 20 includes an outer periphery is made of a metallic structural member or element which has a mechanical strength high enough to withstand the clamping by the cell stacks 36, the intermediate pads 48 and the upper pads 50. On the inner surface of the heat insulated vessel 20, there is provided an insulating material to prevent the elevation of the temperature of the metallic structural element. Since the heat insulating wall 28 is heated from the both sides thereof, a heat-resistant metal having a high mechanical strength at a high temperature is embedded in the heat insulating wall 28 as a padding. In order to prevent backfiring, the first exhaust gas passage 32 is made of a porous ceramic. The partition wall 30 which separates the heat exchanging chamber 26 from the combustion chamber 24 is arranged so that the combustion flame will not contact the metal portion of the heat exchanger directly, and hence the partition wall 30 is not required to be strong and refractory bricks may be used as the partition wall 30.

The size of the cell stack 36 may vary depending on the generated output of the power generator, and a power of 25 kW can be obtained using one cell stack 36 having a size of 40 cm in diameter and 90 cm in height. A power generation module of 200 kW can be obtained by arranging eight such cell stacks. The cell stacks 36 are clamped or fastened with the respective clamp cylinders 62. Thus, the degrees of clamping of the cell stacks 36 can be adjusted respectively depending on the conditions of operation of each cell stack.

The conductor plate 46 is needed for electrically connecting the cell stacks to each other either in series or in parallel. On the upper portions of the cell stacks are fitted flexible, heat-resistant alloy conductors (not shown) to electrically connect the cell stacks, respectively, in the upper part of the heat insulated vessel 20. The conductor is connected to distribution lines (not shown) When the electric conductor is arranged in the stack chamber 22, it is preferably positioned in the fuel gas exhaust chamber 54 to reduce its deterioration by oxidation. Gas inlet pipes for supplying the reactant gases are also positioned in the fuel gas exhaust chamber 54 to decrease their deterioration by oxidation. There are few metals, if any, that are durable under oxidative atmosphere at a high temperature as high as 1,000° C. and such durable metals, if any, generally have poor malleabilities. Accordingly, it is preferred that the gas inlet pipes be positioned under reducing atmosphere such as in the fuel gas exhaust chamber for assuring a prolonged operation of the power generation system.

The starting burner 56 provided in the combustion chamber 24 is necessary for increasing the temperatures of the cell stacks and of the heat exchanger. The starting burner may also be operated supplementally whenever the heat quantity of the exhaust gases is insufficient in the steady-state operation of the power generation system. A fuel may be replenished through the starting burner in case of deficiency of the fuel in the combustion chamber, which would sometimes happen when excessive air is introduced for cooling the cell stacks.

EXAMPLE 2

Figure 6:
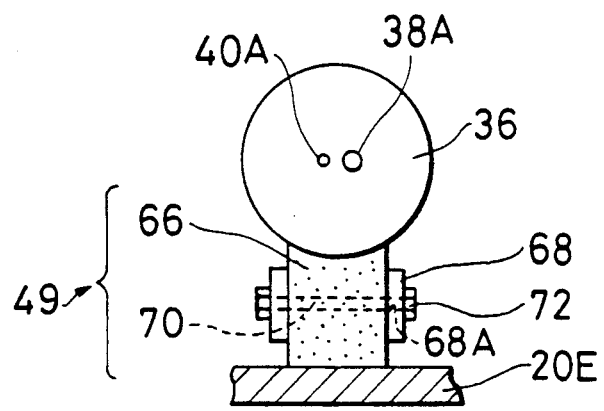
FIG. 6 is an enlarged cross sectional view showing an intermediate pad to be used in a power generation module of a solid electrolyte type fuel cell according to a second example of the present invention.

FIG. 6 is an enlarged cross sectional view showing an intermediate pad to be used in a power generation module of a solid electrolyte type fuel cell according to a second example of the present invention. An intermediate pad 49 includes a sealing member 66, a pair of clamp plates 68 sandwiching the sealing member 66 and each being formed with a through hole 68A, a bolt 70 engaged in the through holes 68A of the clamp plate 68, and a nut 72 in a thread engagement with the bolt 70. Since the operation temperature is as high as 1,000° C. the sealing member 66 is preferably made of a ceramic fiber, for example, a KOAL or alumina fiber. Although the ceramic fiber itself has a high gas permeability and sufficient sealing property is unexpectable as it is, its gas sealability can be increased by clamping the sealing member 66 by way of the clamp plate 68, the bolt 70 and the nut 72. It is not always necessary to try to establish complete gas sealing between the cell stacks 36, but there may occur cross leaking to some extent and thus burning on a minute scale, which will cause no practical problems since the operation temperature is high enough. The sealability may be adjusted by providing an intermediate pad 49 between two adjacent cell stacks 36 and clamping the intermediate pad 49 from outside of the heat insulated vessel 20 between the wall 20E of the heat insulated vessel 20 and the heat insulating wall 28. When alumina fiber is used as the sealing member 66, there is a possibility that the fiber will react with the cell stack 36, and it is preferred to insert a heat-resistant sheet or the like (not shown) between the cell stack and the alumina fiber to prevent such a reaction.

In the arrangement shown in FIG. 6, while the intermediate pad is shown as being provided between the side wall 20E of the heat insulated vessel 20 and the cell stack 36, those intermediate pads provided between the cell stacks 36 have the same construction as the former except that the form of the side end thereof is adapted for the configuration (cylindrical surface) of the cell stack instead of the side wall 20E (flat surface) of the stack chamber 22.

Example 3

Figure 7:
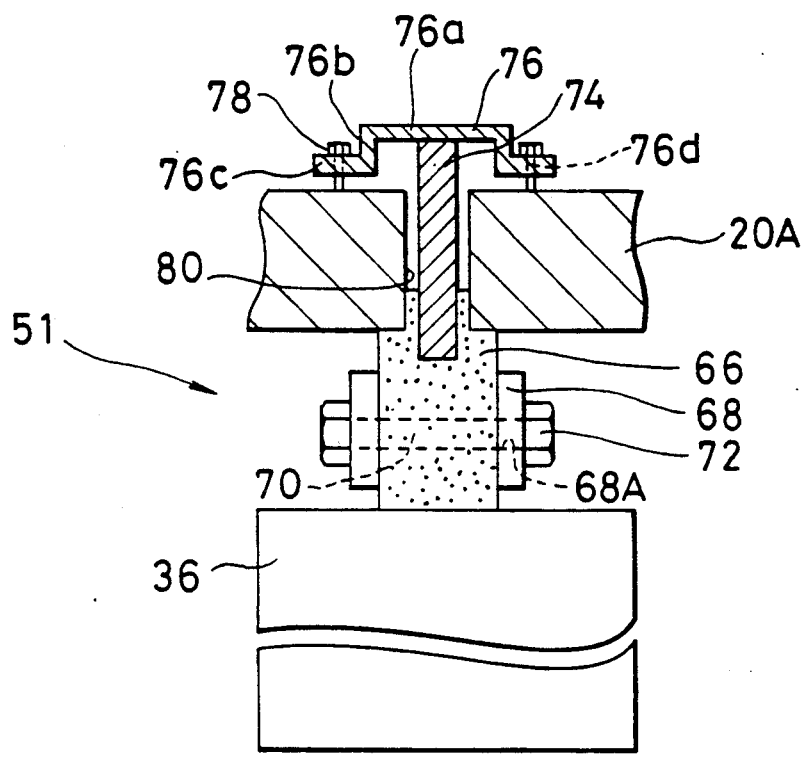
FIG. 7 is an enlarged cross sectional view showing an upper pad to be used in a power generation module of a solid electrolyte type fuel cell according to a third example of the present invention.

FIG. 7 is an enlarged cross sectional view showing an upper pad to be used in a power generation module of a solid electrolyte type fuel cell according to a third example of the present invention. In FIG. 7, an upper pad 51 includes the sealing member 66 inserted between the top of the stack 36 and the upper wall 20A of the heat insulated vessel 20, a pair of clamp plates 68, each being formed with a through hole 68A, a bolt 70 engaged in the through holes 68A of the clamp plates 68, a nut 72 in thread engagement with the bolt 70. The upper pad 51 also includes a tightening plate 74 and a pressing jig 76. The pressing jig 76 has a base 76a in the central portion thereof, vertical bent portions 76b vertically extending from the both ends of the base 76a, respectively, and horizontal bent portions 76c extending horizontally from the respective ends of the horizontal bent portions 76b opposite to the ends at which the vertical portions 76b are connected to the base 76a, the horizontal portions 76c each being formed with a tapped hole 76d in which a bolt 78 is in a thread engagement. On the other hand, in the upper wall 20A of the heat insulated vessel 20, a slit 80 having a thickness smaller than the sealing member 66 is formed in the direction of the, or through, the upper wall 20A. The tightening plate 74 is inserted through the slit 80, one end of the tightening plate 74 pressing the sealing member 66 and the other abutting the base 76a of the pressing jig 76. By rotating the bolt 78 engaged in a tapped hole (not shown) formed in the upper wall 20A of the heat insulated vessel 20 around its axis clockwise or counterclockwise, the bolt 78 is moved up or down, which enables the adjustment of the degree of tightening of the sealing member 66.

In the arrangement shown in FIG. 7, the sealing member 66 is tightened by way of the clamp plates 68, the bolt 70 and the nut 72 to seal the gap between the upper surfaces of the cell stacks 36 and the ceiling 20A of the heat insulated vessel 20. To ensure sufficient sealability, the tightening plate 74 is inserted in the slit 80 formed in the ceiling of the heat insulated vessel 20, and is pressed into the sealing member 66 by way of the pressing jig 76 and the bolt 78. Since the sealing member 66 has a high elastic strength, sufficient gas sealability can be maintained regardless of the up and down movement of the cell stacks 36. The clamp plates 68, the bolt 70 and the nut 72 may preferably be made of an alloy resistant to oxidation in order to withstand a high temperature atmosphere.

EXAMPLE 4

Figure 8:
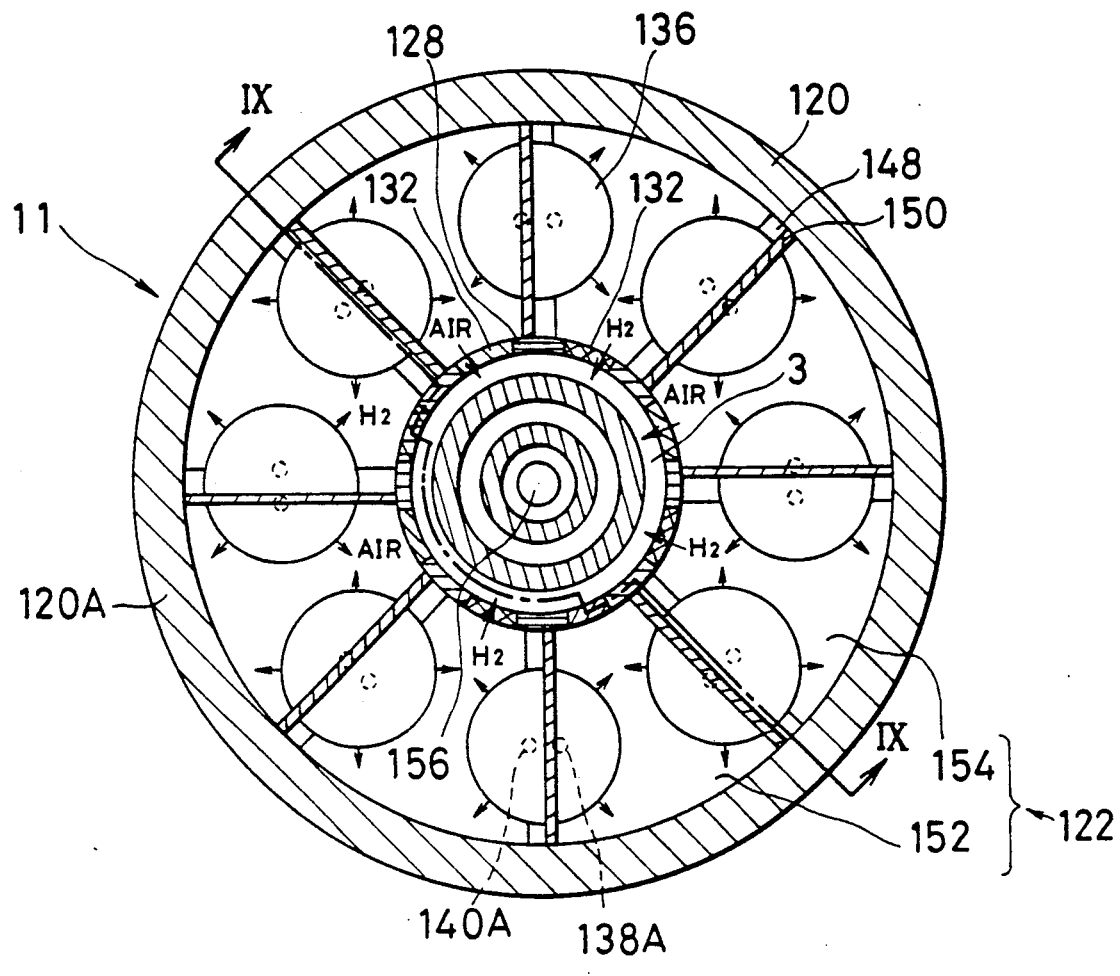
FIG. 8 is a horizontal cross sectional view showing a power generation module of a solid electrolyte type fuel cell according to a fourth example of the present invention.
Figure 9:
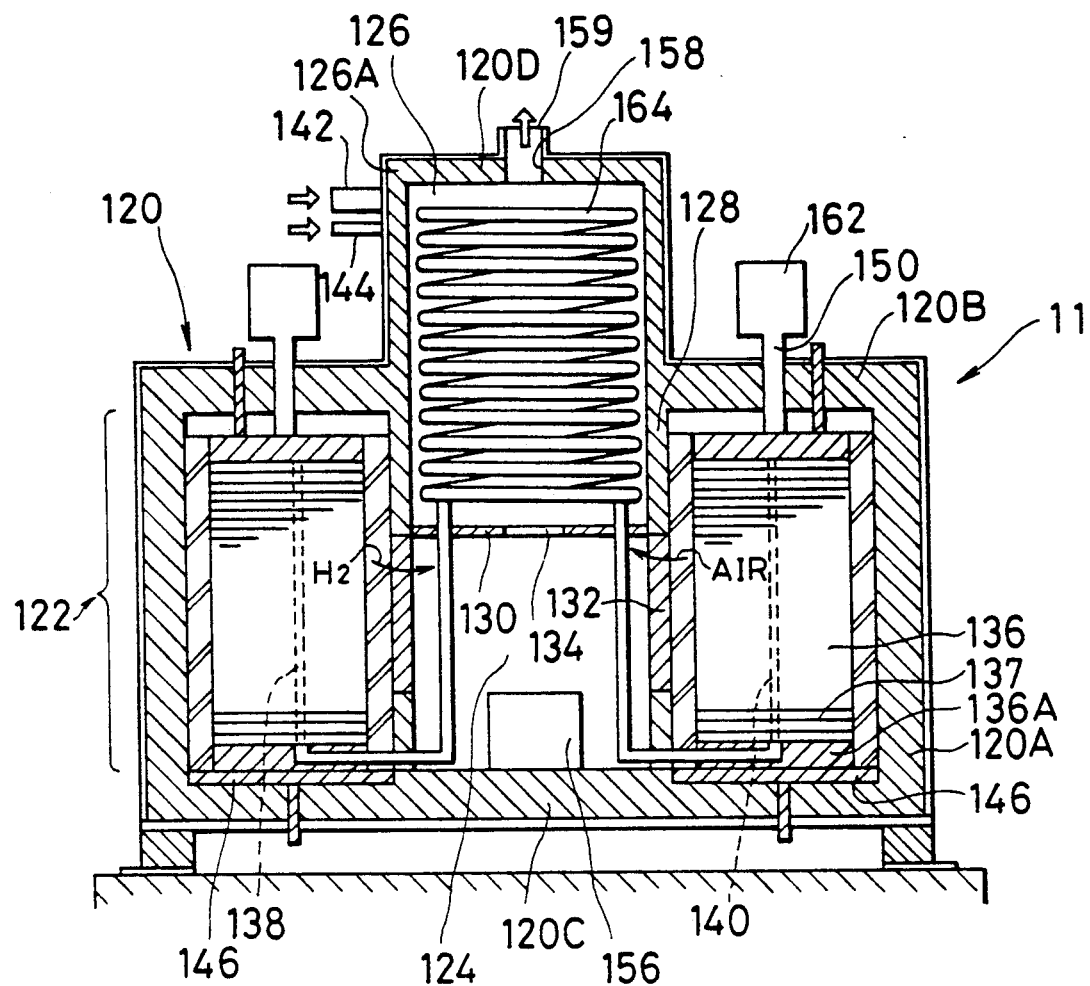
FIG. 9 is a vertical cross sectional view showing a power generation module of a solid electrolyte type fuel cell shown in FIG. 8, as viewed in the direction indicated by arrows IX—IX in FIG. 8.

FIG. 8 is a horizontal cross sectional view showing a power generation module of a solid electrolyte type fuel cell according to a fourth example of the present invention; and FIG. 9 is a vertical cross sectional view showing a power generation module of a solid electrolyte type fuel cell according to the fourth example of the present invention.

Referring to FIGS. 8 and 9, the power generation module 11 includes a cylindrical heat insulated vessel 120 which has a side wall 120A circular in cross section. In the heat insulated vessel 120, a stack chamber 122 is provided as defined by the side wall 120A. In the central area of the stack chamber 122, there is provided a combustion chamber 124 which is cylindrical in cross section and concentric to the stack chamber 122. A heat exchanging chamber 126 is arranged on the combustion chamber 124. In other words, the stack chamber 122 is partitioned by a partition wall (heat insulating wall) 128 from the combustion chamber 124 and the heat exchanging chamber 126 arranged on the combustion chamber 124. The combustion chamber 124 and the heat exchanging chamber 126 are partitioned by a partition wall 130 one from the other. The heat insulating wall 128 has formed therein a plurality of first exhaust gas passages 132 in a portion corresponding to the combustion chamber 124. The combustion chamber 124 and the heat exchanging chamber 126 communicate with each other through the first exhaust gas passages 132. The partition wall 130 has formed therein a second exhaust gas passage 134 through which the combustion chamber 124 and the heat exchanging chamber 126 communicate with each other.

In the stack chamber 122 are arranged, for example, eight cell stacks 136 concentrically. Each cell stack 136 has a bottom plate 136A on which a plurality of single cells 137 are built up one on another, and also has an oxidant gas supply manifold 138 communicating with an oxidant gas inlet port 138A provided on the bottom of each cell stack 136 and a fuel gas supply manifold 140 communicating with a fuel gas inlet port 140A in the central area and on the bottom thereof. An oxidant gas inlet pipe 142 and a fuel gas inlet pipe 144 are arranged through an upper side wall 126A of the heat insulated vessel 120, and connected to the oxidant gas inlet port 138A and the fuel gas inlet port 140A, respectively, through a heat exchanger described later on. The bottom plate 136A of each stack 136 is provided with a through hole through which one end of the heat exchanger extends to communicate with the gas inlet ports 138A and 140A and to the manifolds 138 an 140, respectively.

The bottom plate 136A may be made of an electroconductive material such as aluminum, or it may be electrically connected to a conductor plate 146 as a current output conductor through a lead wire (not shown) or the like. The conductor plate 146 may be in the form of a circular plate, an annulus, or other suitable shapes. The conductor plate may be integrated with the bottom plate.

On the other hand, the cell stacks 136 arranged concentrically in the stack chamber 122 have gaps between themselves and between them and the circular side wall 120A and the partition wall 128. These gaps are filled or sealed with intermediate pads 148. Also, there are gaps between the cell stacks 136 and the upper wall 120B, and between the intermediate pads 148 and the upper wall 120B of the heat insulated vessel 120. These gaps are filled or sealed by upper pads 150. Thus, there are formed a plurality of oxidant gas exhaust chambers 152 and a plurality of fuel gas exhaust chambers 154, alternately arranged and partitioned or sealed by the cell stacks 136 and the intermediate pads 148 and the upper pads 150. When a gas exhaust chamber defined by two adjacent cell stacks 136 together with the intermediate pads 148 and the upper pads 150 is an oxidant gas exhaust chamber 152, the oxidant gas flow passing single cells 137 in each of the two neighboring cell stacks 136 is exhausted in the direction indicated by arrows, on the other hand, the fuel gas flow passing through the single cells 137 is exhausted into the fuel gas exhaust chamber 154 adjacent to the oxidant gas exhaust chamber 152.

A starting burner 156 is arranged on the bottom 120C of the heat insulated vessel 120, more specifically, in the combustion chamber 124. Further, an exhaust gas outlet port 158 is provided in the top wall 120D of the heat insulated vessel 120. An exhaust gas duct 159 (corresponding to 17 in FIG. 3) is connected to the exhaust gas outlet port 158.

On the top of each cell stack 136 butts a clamp rod 160. Each clamp rod 160 is connected to a clamp cylinder 162 which moves the clamp rod 160 up and down to control the degree of tightening of the cell stack 136.

A heat exchanger 164 is arranged in the heat exchanging chamber 126. The heat exchanger 164 is connected at one end thereof to the oxidant gas inlet pipe 142 and the fuel gas inlet pipe 144, and at the other end thereof to the oxidant gas inlet port 138A and the fuel gas inlet port 140A.

In the fuel cell having the aforementioned construction, first the starting burner 156 is ignited, and a fuel gas and an oxidant gas are burnt in the combustion chamber 124. While continuing the combustion, the heat exchanger 164 is heated. On this occasion, $N_2$ gas is flown in the fuel gas inlet pipe 144 and the oxidant gas inlet pipe 142 and reaches the heat exchanger 164 where $N_2$ gas is heated. The heated $N_2$ gas is supplied to the cell stacks 136 to elevate their temperature. When the temperatures of the cell stacks 136 reach a predetermined value, air is supplied into the oxidant gas inlet pipe 142, and a fuel gas such as natural gas is supplied into the fuel gas inlet pipe 144 to initiate power generation. When a state is reached where the power generation system is run in a steady state, the operation of the starting burner 156 is stopped. When the power generation is to be stopped, a load of the power generation module is disconnected and at the same time the supply of gas is switched from the oxidant gas and the fuel gas to $N_2$. This results in the removal of a heat source, and hence power generation stops and the temperature of the cell stacks decreases.

Now, explanation will be made on steady-state operation of the power generation system of the present invention. After being passed through the heat exchanger 164 and heated to temperatures on the order within the range of 700° to 900° C., the oxidant gas and the fuel gas are supplied to the cell stacks 136 via the respective oxidant gas inlet ports 138A and the fuel gas inlet ports 140A, respectively, and through the oxidant gas supply manifold 138 and the fuel gas supply manifold 140, respectively, provided in the central portions of the cell stacks. The oxidant gas and the fuel gas from the cell stacks 136 are exhausted into the oxidant gas exhaust chamber 152 and the fuel gas exhaust chamber 154, respectively. These chambers 152 and 154 are partitioned by the upper pads 150 and intermediate pads 148 as well as the cell stacks 136 themselves. The exhausted reactant gases are sent to the combustion chamber 124 through the first exhaust gas passages 132 provided in the heat insulating wall 128. In the combustion chamber 124, the reactant gases are mixed and burnt. The combustion gas flows up toward the heat exchanger 164, and after being cooled down to 400° C. or lower upon contact with the heat exchanger 164, it is released from the exhaust gas outlet port 158 and through the exhaust gas duct 159.

The heat insulated vessel 120 includes an outer periphery is made of a metallic structural member or element which has a mechanical strength high enough to withstand the clamping of the cell stacks 136, the intermediate pads 148 and the upper pads 150. On the inner surface of the heat insulated vessel 120 is provided an insulating material to prevent the elevation of the temperature of the metallic structural element. Since the heat insulating wall 128 is heated from the both sides thereof, a heat-resistant metal having a high mechanical strength at a high temperature is embedded in the heat insulating wall 128 as a padding. In order to prevent backfiring, the first exhaust gas passage 132 is preferably made of a porous ceramic. The partition wall 130 which separates the heat exchanging chamber 126 from the combustion chamber 124 is arranged so that the combustion flame will not contact the metal portion of the heat exchanger directly. Therefore, the partition wall 130 is not required to be strong, and may be made of refractory bricks.

The size of the cell stack 136 may vary depending on the generated output of the power generation system, and a power of 25 kW can be obtained using one cell stack 36 having a size of 40 cm in diameter and 90 cm in height. A power generation module of 200 kW can be obtained by arranging eight such cell stacks. The cell stacks 136 are clamped or fastened with the respective clamp cylinders 162. Thus, the degrees of clamping of the cell stacks 136 can be adjusted respectively depending on the operating condition of each cell stack.

As shown in FIG. 9, a conductor plate 146 is provided on the bottom of the stack chamber 122 to electrically connect the cell stacks 136 to each other either in series or in parallel connection. On the upper portions of the cell stacks 136 are fitted flexible, heat-resistant alloy conductors (not shown) to electrically connect the cell stacks, respectively, in the upper part of the heat insulated vessel 120. The conductor is connected to distribution lines (not shown). When the electric conductor is arranged in the stack chamber 122, it is preferably arranged in the fuel gas exhaust chamber 54 to reduce its deterioration by oxidation. Gas inlet pipes for supplying the reactant gases, respectively, are also positioned in the fuel gas exhaust chamber 154 to decrease their deterioration by oxidation. There are few metals, if any, that are durable under oxidative atmosphere at a high temperature as high as 1,000° C., and such durable metals, if any, generally have poor malleabilities. Accordingly, it is preferred that the gas inlet pipes be positioned under reducing atmosphere such as in the fuel gas exhaust chamber for assuring a prolonged operation of the power generation system.

The starting burner 156 provided in the combustion chamber 124 is necessary for increasing the temperatures of the cell stacks 136 and of the heat exchanger 164. The starting burner 156 may also be operated supplementally whenever the heat quantity of the exhaust gases is insufficient in the steady-state operation of the power generation system. A fuel may be replenished through the starting burner when the fuel becomes insufficient in the combustion chamber, which would sometimes happen when excessive air is introduced for cooling the cell stacks.

In the arrangement shown in FIGS. 8 and 9, eight cell stacks are arranged in the stack chamber 122 symmetrically with respect to the center of the circular stack chamber 122, and the combustion chamber 124 having the starting burner 156 on the bottom is arranged in the central region of the stack chamber 124 or the heat insulated vessel 120, and further the heat exchanging chamber 126 containing the heat exchanger 164 is arranged on the combustion chamber 124, with the oxidant gas and fuel gas being introduced into the cell stacks from the bottom of each cell stack. With this arrangement, the amount of heat released from the combustion chamber and the heat exchanging chamber to the surroundings is reduced, which permits efficient utilization of energy generated.

Because of its symmetrical arrangement, the temperature distribution in the power generation module is substantially uniform. This minimizes the performance variation among the cell stacks to thereby stabilize the performance of the whole module. The number of the stacks is not limited to eight, and four or six cell stacks may be stably used as well.

EXAMPLE 5

A power generation module is constructed in the same manner as the power generation module of Example 4 shown in FIGS. 8 and 9 except that the intermediate pad 148 shown in FIG. 8 is replaced by the tightening mechanism described in Example 2 shown in FIG. 6, i.e., the intermediate pad 49 including the sealing member 66, a pair of clamp plates 68 sandwiching the sealing member 66 and each being formed with a through hole 68A, the bolt 70 engaged in the through holes 68A of the clamp plates 68, and the nut 72 in a thread engagement with the bolt 70.

The power generation system including the power generation module thus obtained can be operated with a high reliability and a high stability, with permitting controlling the sealability of the intermediate pads, like the power generation system of Example 4 above.

EXAMPLE 6

A power generation module is constructed in the same manner as the power generation module of Example 4 shown in FIGS. 8 and 9 except that the tightening mechanism including the clamp rod 150 and the clamp cylinder 162 shown in FIG. 9 is replaced by the tightening mechanism described in Example 3 shown in FIG. 7, i.e., the upper pad 51 including the sealing member 66, the clamp plates 68 sandwiching the sealing member 66 and each being formed with a through hole 68A, the bolt 70 engaged in the through holes 68A of the clamp plates 68, and the nut 72 in a thread engagement with the bolt 70.

In the arrangement of this example, the slit 80 (cf. FIG. 7) is provided in the upper wall 120B of the heat insulated vessel 120 shown in FIG. 9. In the slit 80 is inserted the sealing member 66 and also the clamp plate 74. The upper end of the clamp plate 74 contacts the pressing jig 76 having the base 76a, the vertical bent portion 76b and the horizontal bent portion 76c and being controllably fixed to the upper wall 120B with the bolts 78 in a thread engagement in the tapped holes 70d provided in the horizontal bent portion 70c, and is pressed by the pressing jig 76. As a result, the other end or lower end of the clamp plate 74 compresses the sealing member 66 inserted between the upper wall 120B of the heat insulated vessel 120 and the upper parts of the cell stacks 136. Thus, the compressed sealing member 66 is in an intimate contact on one hand with the upper portion of the cell stacks and on the other hand with the lower surface of the upper wall 120B (ceiling of the stack chamber), and is partly inserted into the slit 80. This construction gives a good seal for gaps between the cell stack and the ceiling 120B and also between the intermediate pads 148 and the ceiling 120B.

The intermediate pads 148 may be replaced by the arrangement shown in FIG. 6.

The power generation system having the power generation module thus obtained can be operated with a high reliability and a high stability, with permitting controlling the sealability of the intermediate pads.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A planar solid electrolyte fuel cell power generation system comprising:
   (A) a power generation module including:
     (a) a heat insulated vessel,
     (b) a first partition wall provided in said heat insulated vessel and having a first exhaust gas passage,
     (c) a second partition wall provided in said heat insulated vessel and having a second exhaust gas passage,
     (d) a stack chamber provided in said heat insulated vessel and partitioned by said first partition wall, said stack chamber having first and second inner surfaces,
     (e) a combustion chamber provided in said heat insulated vessel adjacent to said stack chamber through said first partition wall, and partitioned by said first and second partition walls, said combustion chamber communicating with said stack chamber through said first exhaust gas passage,
     (f) a heat exchanging chamber provided in said heat insulated vessel adjacent to said combustion chamber through said second partition wall, said heat exchanging chamber communicating with said combustion chamber through said second exhaust gas passage,
     (g) a cell stack provided in said stack chamber with gaps between it and said first and second inner surfaces of said stack chamber, respectively, said cell stack having:
       (g-1) a plurality of planar single cells built up one on another,
       (g-2) an oxidant gas supply manifold for supplying an oxidant gas to said planar single cells and extending through said plurality of planar single cells,
       (g-3) a fuel gas supply manifold for supplying a fuel gas to said planar single cells, and
       (g-4) a current output conductor for outputting electricity generated by said planar single cells and connected to said cell stack,
     (h) a sealing means provided in said stack chamber and in contact with said cell stack and said first and second inner surfaces, respectively, of said stack chamber, (i) an oxidant gas exhaust chamber for collecting an oxidant gas exhausted from said cell stack, said oxidant gas exhaust chamber provided in said stack chamber and partitioned by said sealing means and said cell stack, said oxidant gas exhaust chamber communicating with said combustion chamber through said first exhaust gas passage, (j) a fuel gas exhaust chamber for collecting a fuel gas exhausted from said cell stack, said fuel gas exhaust chamber provided in said stack chamber and partitioned by said sealing means and said cell stack, said fuel gas exhaust chamber communicating with said combustion chamber through said first exhaust gas passage, (k) a heat exchanger, provided in said heat exchanging chamber, for preheating said fuel gas and said oxidant gas supplied to said cell stack, respectively, (l) a fuel gas supply pipe communicating with said heat exchanger, and (m) an oxidant gas supply pipe communicating with said heat exchanger;

(B) an inverter connected to said cell stack in said stack chamber and for inverting direct current generated by said single cells into alternating current; and (C) a control device connected to said power generation module and said control device, controlling operation of said power generation system;

whereby said exhaust oxidant gas and said exhaust fuel gas, exhausted from said cell stack and passed through said first exhaust gas passage, are burnt in said combustion chamber to form a combustion gas, and said combustion gas is introduced into said heat exchanging chamber.

2. A planar solid electrolyte fuel cell power generation system as claimed in claim 1, wherein said stack chamber comprises a plurality of cell stacks.

3. A planar solid electrolyte fuel cell power generation system as claimed in claim 2, wherein said sealing means comprises an intermediate pad means and an upper pad means, said intermediate pad means comprising a plurality of intermediate pads being provided between said cell stacks, between one of said cell stacks and said first inner surface of said stack chamber, and between one of said cell stack and said first partition wall, respectively, and said upper pad means being provided between said second inner surface of said stack chamber and respective upper portions of said cell stacks and respective upper portions of said intermediate pads.

4. A planar solid electrolyte fuel cell power generation system as claimed in claim 3, wherein said intermediate pad means comprises a fibrous sealing member, a pair of metal clamp plates formed with through holes, respectively, and sandwiching said fibrous sealing member therebetween, and a bolt engaged with said through holes of said clamp plates.

5. A planar solid electrolyte fuel cell power generation system as claimed in claim 3, wherein said upper pad means comprises a pair of clamp plates formed with through holes, respectively, a bolt engaged with said through holes, a fibrous sealing member sandwiched between said clamp plates, a pressing jig provided on said second inner surface of said stack chamber, and a pressing plate contacting said pressing jig and said fibrous sealing member.

6. A planar solid electrolyte fuel cell power generation system as claimed in claim 2, wherein said cell stacks are arranged in a point-centered symmetry.

7. A planar solid electrolyte fuel cell power generation system as claimed in claim 6, wherein said power generation module has said combustion chamber in a central area thereof, said stack chamber surrounding said combustion chamber.

8. A planar solid electrolyte fuel cell power generation system as claimed in claim 7, wherein said power generation module has said heat exchanging chamber in a central area thereof.

9. A planar solid electrolyte fuel cell power generation system as claimed in claim 8, wherein said oxidant gas supply manifold, said fuel gas supply manifold, and said current output conductor are arranged in said fuel gas exhaust chamber.

10. A planar solid electrolyte fuel cell power generation system as claimed in claim 8, said sealing means comprises a clamp cylinder provided outside said power generation module, a clamp rod connected to and actuated by said cylinder, and a sealing member tightened by said clamp rod.

11. A planar solid electrolyte fuel cell power generation system as claimed in claim 10, wherein said clamp rod is provided in said fuel gas exhaust chamber.

12. A planar solid electrolyte fuel cell power generation system as claimed in claim 10, wherein said clamp cylinder is a hydraulic cylinder or a gas cylinder.

13. A planar solid electrolyte fuel cell power generation system as claimed in claim 8, wherein said sealing means comprises an intermediate pad means and an upper pad means, said intermediate pad means comprising a plurality of intermediate pads being provided between said cell stacks, between one of said cell stacks and said first inner surface of said stack chamber, and between one of said cell stack and said first partition wall, respectively, and said upper pad means being provided between said second inner surface of said stack chamber and respective upper portions of said cell stacks and respective upper portions of said intermediate pads.

14. A planar solid electrolyte fuel cell power generation system as claimed in claim 13, wherein said intermediate pad means comprises a fibrous sealing member, a pair of metal clamp plates formed with through holes, respectively, and sandwiching said fibrous sealing member therebetween, and a bolt engaged with said through holes of said clamp plates.

15. A planar solid electrolyte fuel cell power generation system as claimed in claim 13, wherein said upper pad means comprises a pair of clamp plates formed with through holes, respectively, a bolt engaged with said through holes, a fibrous sealing member sandwiched between said clamp plates, a pressing jig provided on said second inner surface of said stack chamber, and a pressing plate contacting said pressing jig and said fibrous sealing member.

16. A planar solid electrolyte fuel cell power generation system as claimed in claim 8, further comprising a starting burner in said combustion chamber.

17. A planar solid electrolyte fuel cell power generation system as claimed in claim 1, wherein said oxidant gas supply manifold, said fuel gas supply manifold, and said current output conductor are arranged in said fuel gas exhaust chamber.

18. A planar solid electrolyte fuel cell power generation system as claimed in claim 1, wherein said sealing means comprises a clamp cylinder provided outside said power generation module, a clamp rod connected to and actuated by said cylinder, and a sealing member tightened by said clamp rod.

19. A planar solid electrolyte fuel cell power generation system as claimed in claim 18, wherein said clamp rod is provided in said fuel gas exhaust chamber.

20. A planar solid electrolyte fuel cell power generation system as claimed in claim 18, wherein said clamp cylinder is a hydraulic cylinder or a gas cylinder.

21. A planar solid electrolyte fuel cell power generation system as claimed in claim 1, wherein said sealing means comprises an intermediate pad and an upper pad, said intermediate pad being provided between said cell stack and said first inner surface of said stack chamber and between said cell stack and said first partition wall.

22. A planar solid electrolyte fuel cell power generation system as claimed in claim 1, further comprising a starting burner in said combustion chamber.

23. A power generation module for a planar solid electrolyte fuel cell power generation system, comprising:
(a) a heat insulated vessel,
(b) a first partition wall provided in said heat insulated vessel and having a first exhaust gas passage,
(c) a second partition wall provided in said heat insulated vessel and having a second exhaust gas passage,
(d) a stack chamber provided in said heat insulated vessel and partitioned by said first partition wall, said stack chamber having first and second inner surfaces,
(e) a combustion chamber provided in said heat insulated vessel adjacent to said stack chamber through said first partition wall, and partitioned by said first and second partition walls, said combustion chamber communicating with said stack chamber through said first exhaust gas passage,
(f) a heat exchanging chamber provided in said heat insulated vessel adjacent to said combustion chamber through said second partition wall, said heat exchanging chamber communicating with said combustion chamber through said second exhaust gas passage,
(g) a cell stack provided in said stack chamber with gaps between it and said first and second inner surfaces of said stack chamber, respectively, said cell stack having:
(g-1) a plurality of planar single cells built up one on another,
(g-2) an oxidant gas supply manifold for supplying an oxidant gas to said planar single cells and extending through said plurality of planar single cells,
(g-3) a fuel gas supply manifold for supplying a fuel gas to said planar single cells and extending through said plurality of planar single cells, and
(g-4) a current output conductor for outputting electricity generated by said planar single cells and connected to said cell stack,
(h) a sealing means provided in said stack chamber and in contact with said cell stack and said first and second inner surfaces, respectively, of said stack chamber,
(i) an oxidant gas exhaust chamber for collecting an oxidant gas exhausted from said cell stack, said oxidant gas exhaust chamber provided in said stack chamber and partitioned by said sealing means and said cell stack, said oxidant gas exhaust chamber communicating with said combustion chamber through said first exhaust gas passage,
(j) a fuel gas exhaust chamber for collecting a fuel gas exhausted from said cell stack, said fuel gas exhaust chamber provided in said stack chamber and partitioned by said sealing means and said cell stack, said fuel gas exhaust chamber communicating with said combustion chamber through said first exhaust gas passage,
(k) a heat exchanger, provided in said heat exchanging chamber, for preheating said fuel gas and said oxidant gas supplied to said cell stack, respectively,
(l) a fuel gas supply pipe communicating with said heat exchanger, and
(m) an oxidant gas supply pipe communicating with said heat exchanger;
whereby said exhaust oxidant gas and said exhaust fuel gas, exhausted from said cell stack and passed through said first exhaust gas passage, are burnt in said combustion chamber to form a combustion gas, and said combustion gas is introduced into said heat exchanging chamber.

24. A sealing device for sealing a stack chamber in a power generation module for a planar solid electrolyte fuel cell power generation system, the power generation module having:
(i) a heat insulated vessel having an outer surface, an inner wall surface, and a ceiling,
(ii) a first partition wall provided in said heat insulated vessel and having therein a first exhaust gas passage,
(iii) a second partition wall provided in said heat insulated vessel and having therein a second exhaust gas passage,
(iv) a stack chamber provided in said heat insulated vessel and partitioned by said first partition wall, said stack chamber containing a cell stack having a plurality of planar single cells built up one on another, an oxidant gas supply manifold extending through said plurality of planar single cells, and a fuel gas supply manifold extending through said plurality of planar single cells,
(v) a combustion chamber provided in said heat insulated vessel adjacent to said stack chamber through said first partition wall, and partitioned by said first and second partition walls, said combustion chamber communicating with said stack chamber through said first exhaust gas passage, and a current output conductor connected to said cell stack, and
(vi) a heat exchanging chamber provided in said heat insulated vessel adjacent to said combustion chamber through said second partition wall, said heat exchanging chamber communicating with said combustion chamber through said second exhaust gas passage,
wherein said ceiling of said heat insulated vessel is formed with a slit, and
wherein said sealing device comprises:
(a) an intermediate pad provided between said cell stack and said inner side wall surface of said stack chamber, or between said cell stack and said first partition wall, and for sealing gaps therebetween, said intermediate pad having:
(a-1) a fibrous sealing member, (a-2) a pair of metal clamp plates formed with through holes, respectively, and sandwiching said fibrous sealing member therebetween, and (a-3) a bolt in a thread engagement with said through holes of said clamp plates; and (b) an upper pad provided between said ceiling of said heat insulated vessel and said cell stack and between said ceiling of said heat insulated vessel and said intermediate pad and for sealing gaps therebetween, said upper pad comprising:

(b-1) a fibrous sealing member, (b-2) a pair of clamp plates formed with through holes, respectively, and sandwiching therebetween said fibrous sealing member, (b-3) a bolt in a thread engagement with said through holes, (b-4) a pressing plate having first and second ends and inserted in said slit in said ceiling of said heat insulated vessel, with said first end contacting said sealing member, and said second end being outside said heat insulated vessel, (b-5) a pressing jig provided outside said inner wall surfaced of said heat insulated vessel, and contacting the outer surface of said heat insulated vessel, said pressing jig having a central portion and two ends, said central portion is in contact with said second end of said pressing plate, said pressing jig being attached on said two ends to said outer surface of said heat insulated vessel for advancing and retreating with respect to said outer surface of said heat insulated vessel.

* * * * *